United States Patent
Loeken et al.

(10) Patent No.: US 12,111,183 B2
(45) Date of Patent: Oct. 8, 2024

(54) ANGULAR DISPLACEMENT MEASURING ARRANGEMENT, ANGULAR DISPLACEMENT MEASURING SYSTEM AND ELECTRIC MOTOR

(71) Applicant: FRABA B.V., Sg Heerlen (NL)

(72) Inventors: Michael Loeken, Juelich (DE);
Carmen Alejandro Sanchez Gonzalez, Aachen (DE)

(73) Assignee: FRABA B.V., Sg Heerlen (NL)

( * ) Notice: Subject to any disclaimer, the term of this patent is extended or adjusted under 35 U.S.C. 154(b) by 246 days.

(21) Appl. No.: 17/639,911

(22) PCT Filed: Sep. 5, 2019

(86) PCT No.: PCT/EP2019/073736
§ 371 (c)(1),
(2) Date: Mar. 3, 2022

(87) PCT Pub. No.: WO2021/043409
PCT Pub. Date: Mar. 11, 2021

(65) Prior Publication Data
US 2022/0333959 A1    Oct. 20, 2022

(51) Int. Cl.
*G01D 11/24*    (2006.01)
*G01D 5/14*    (2006.01)
*G01D 5/20*    (2006.01)

(52) U.S. Cl.
CPC ............ *G01D 11/245* (2013.01); *G01D 5/14* (2013.01)

(58) Field of Classification Search
CPC ........ G01D 11/24; G01D 11/245; G01D 5/14; G01D 5/142; G01D 5/145; G01D 5/147; G01D 5/20
See application file for complete search history.

(56) References Cited

U.S. PATENT DOCUMENTS

| | | |
|---|---|---|
| 2005/0073299 A1 | 4/2005 | Yoshikawa et al. |
| 2008/0164867 A1 | 7/2008 | Steinich et al. |

(Continued)

FOREIGN PATENT DOCUMENTS

| | | |
|---|---|---|
| CN | 106168519 A | 11/2016 |
| CN | 107431410 A | 12/2017 |

(Continued)

*Primary Examiner* — Justin Seo
*Assistant Examiner* — Kendrick X Liu
(74) *Attorney, Agent, or Firm* — Norman B. Thot (57) ABSTRACT

A rotary angle measuring arrangement includes a shaft, and a rotary angle measuring system which detects a rotary shaft movement. The rotary angle measuring system includes an excitation unit connected to the shaft which generates a magnetic field, a magnetic field sensor, a PCB arrangement, and an evaluation electronics arranged on the PCB arrangement and electrically connected to the magnetic field sensor. The PCB arrangement includes a first PCB section arranged perpendicular to a longitudinal axis of the shaft, and a second PCB section angled with respect to the first PCB section and electrically connected thereto. The magnetic field sensor is arranged on the first PCB section. The magnetic field is detectable via the magnetic field sensor. A parallel projection of the second PCB section onto a longitudinal plane parallel to the longitudinal axis and a parallel projection of the excitation unit onto the longitudinal plane at least partially overlap.

20 Claims, 3 Drawing Sheets

(56) References Cited

U.S. PATENT DOCUMENTS

| | | | |
|---|---|---|---|
| 2011/0080162 A1* | 4/2011 | Steinich | G01B 7/30 |
| | | | 324/207.25 |
| 2011/0184691 A1* | 7/2011 | Mehnert | G01P 3/4815 |
| | | | 702/151 |
| 2011/0303001 A1 | 12/2011 | Hirose et al. | |
| 2014/0312746 A1* | 10/2014 | Taniguchi | H02K 29/06 |
| | | | 310/68 B |
| 2015/0028858 A1* | 1/2015 | Putinier | G01D 5/145 |
| | | | 324/207.14 |
| 2015/0381016 A1 | 12/2015 | Tsuda et al. | |
| 2016/0254732 A1* | 9/2016 | Kojima | B62D 5/0406 |
| | | | 310/68 R |
| 2016/0336837 A1 | 11/2016 | Ohnishi et al. | |
| 2016/0339948 A1 | 11/2016 | Nakamura et al. | |
| 2018/0115224 A1 | 4/2018 | Yamashita | |
| 2020/0141770 A1 | 5/2020 | Loeken | |

FOREIGN PATENT DOCUMENTS

| | | |
|---|---|---|
| DE | 10 2004 047 991 A1 | 6/2005 |
| DE | 10 2007 018 758 A1 | 7/2008 |
| DE | 10 2014 205 386 A1 | 9/2015 |
| JP | H08-49575 A | 2/1996 |
| JP | H11-215774 A | 8/1999 |
| JP | 2003-294409 A | 10/2003 |
| JP | 2010-60488 A | 3/2010 |
| JP | 2015-146700 A | 8/2015 |
| JP | 2015-220969 A | 12/2015 |
| JP | 2016-3888 A | 1/2016 |
| JP | 2016-48182 A | 4/2016 |
| JP | 2016-192832 A | 11/2016 |
| JP | 2016-217871 A | 12/2016 |
| JP | 2018-54489 A | 4/2018 |
| WO | WO 2018/219454 A1 | 12/2018 |

* cited by examiner

ANGULAR DISPLACEMENT MEASURING ARRANGEMENT, ANGULAR DISPLACEMENT MEASURING SYSTEM AND ELECTRIC MOTOR

CROSS REFERENCE TO PRIOR APPLICATIONS

This application is a U.S. National Phase application under 35 U.S.C. § 371 of International Application No. PCT/EP2019/073736, filed on Sep. 5, 2019. The International Application was published in German on Mar. 11, 2021 as WO 2021/043409 A1 under PCT Article 21(2).

FIELD

The present invention is directed to a rotary angle measuring arrangement comprising a rotatable shaft and a rotary angle measuring system for detecting a rotary shaft movement, the rotary angle measuring system comprising: an excitation unit which is co-rotatably connected to the shaft and which comprises at least one permanent magnetic excitation magnet, a printed circuit board arrangement comprising a first printed circuit board section which is arranged perpendicular to a longitudinal shaft axis, and a second printed circuit board section which is arranged angled with respect to the first printed circuit board section and which is electrically connected to the first printed circuit board section via a connection device, a first magnetic field sensor which is arranged on the first printed circuit board section and via which an excitation magnetic field generated by the excitation unit can be detected, and an evaluation electronics which is arranged on the printed circuit board arrangement and which is electrically connected to the first magnetic field sensor.

BACKGROUND

Such rotary angle measuring arrangements are used to detect rotary movements of a shaft, wherein rotary angle measuring systems are often also referred to as angle measuring devices, rotary angle sensors, or rotary encoders. Such rotary angle measuring arrangements are in particular used to control and to monitor electric motors, in particular servomotors, in machines, systems or vehicles. The installation space available for the rotary angle measuring system in these applications is often limited.

DE 10 2007 018 758 A1, for example, describes a rotary angle measuring arrangement with a rotary angle measuring system comprising a printed circuit board arrangement with a first printed circuit board section which is arranged perpendicular to a longitudinal shaft axis, a second printed circuit board section which is arranged angled with respect to the first printed circuit board section, and a third printed circuit board section which is flexible and which electrically connects the first printed circuit board section to the second printed circuit board section. Due to the angled arrangement of the printed circuit board sections, the disclosed rotary angle measuring arrangement has a relatively small radial extent but a relatively large axial extent. Not only is the available radial installation space for the rotary angle measuring system limited, however, but also the available axial installation space.

SUMMARY

An aspect of the present invention is to provide a rotary angle measuring arrangement with a relatively compact rotary angle measuring system.

In an embodiment, the present invention provides a rotary angle measuring arrangement which includes a shaft which is configured to rotate, and a rotary angle measuring system which is configured to detect a rotary shaft movement. The shaft comprises a longitudinal shaft axis. The rotary angle measuring system comprises an excitation unit which is configured to generate an excitation magnetic field and which is co-rotatably connected to the shaft, a printed circuit board arrangement, a first magnetic field sensor, and an evaluation electronics which is arranged on the printed circuit board arrangement and which is electrically connected to the first magnetic field sensor. The excitation unit comprises at least one permanent magnetic excitation magnet. The printed circuit board arrangement comprises a first printed circuit board section which is arranged perpendicular to the longitudinal shaft axis, and a second printed circuit board section which is arranged at an angle with respect to the first printed circuit board section and which is electrically connected to the first printed circuit board section via a connection device. The first magnetic field sensor is arranged on the first printed circuit board section. The excitation magnetic field generated by the excitation unit is detectable via the first magnetic field sensor. The second printed circuit board section is arranged so that a parallel projection of the second printed circuit board section onto a longitudinal plane which is parallel to the longitudinal shaft axis and a parallel projection of the excitation unit onto the longitudinal plane at least partially overlap.

BRIEF DESCRIPTION OF THE DRAWINGS

The present invention is described in greater detail below on the basis of embodiments and of the drawings in which.

DETAILED DESCRIPTION

The directions "radial" and "axial" as used herein always refer to the (potential) orientation of the shaft which is to be detected via the rotary angle measuring system.

According to the present invention, the second printed circuit board section is arranged so that a parallel projection of the second printed circuit board section onto a longitudinal plane which is parallel to the longitudinal shaft axis and a projection of the excitation unit onto this longitudinal plane at least partially overlap. The longitudinal plane can be any plane that is parallel to the longitudinal shaft axis, i.e., any plane whose surface normal is perpendicular to the longitudinal shaft axis. The second printed circuit board section is thus arranged at least partially radially neighboring the excitation unit. An end of the second printed circuit board section facing away from the first printed circuit board section can, for example, not axially project over an axial end of the excitation unit facing away from the first printed circuit board section. Only a relatively small portion of the second printed circuit board section axially projects over the axial end of the excitation unit which faces away from the first printed circuit board section, for example, the axial overhang of the second printed circuit board section over the axial end of the excitation unit which faces away from the first printed circuit board section is at most 10% of the axial extent of the second printed circuit board section.

Due to the angled arrangement of the second printed circuit board section, only a relatively small radial installation space is required for the rotary angle measuring system according to the present invention at the shaft. Because the second printed circuit board section is arranged at least partially radially neighboring the excitation unit and, for example, only slightly axially projects over the excitation unit, only a relatively small axial installation space is furthermore required for the rotary angle measuring system according to the present invention. As a result, this provides a rotary angle measuring arrangement with a relatively compact rotary angle measuring system.

The angle between the first printed circuit board section and the second printed circuit board section can, for example, be in an angular range of 70° to 110°, for example, in an angular range of 80° to 100°. This provides a printed circuit board arrangement having a particularly small radial extent and thus provides a particularly compact rotary angle measuring system.

In an embodiment of the present invention, the second printed circuit board section can, for example, be arranged so that a parallel projection of the second printed circuit board section onto a transverse plane which is perpendicular to the longitudinal shaft axis, and a parallel projection of the first printed circuit board section onto this transverse plane, at least partially overlap. The transverse plane can be any plane which extends transversely to the longitudinal shaft axis, i.e., any plane whose surface normal is parallel to the longitudinal shaft axis. The second printed circuit board section is thus arranged axially neighboring the first printed circuit board section. The second printed circuit board section can, for example, be arranged so that at least 90% of the transverse plane projection area of the second printed circuit board section is within the transverse plane projection area of the first printed circuit board section. The second printed circuit board section can, for example, be arranged so that the transverse plane projection area of the second printed circuit board section is located completely within the transverse plane projection area of the first printed circuit board section. This provides a printed circuit board arrangement having a particularly small radial extent and thus provides a particularly compact rotary angle measuring system.

The connection device can, for example, be defined by a flexible third printed circuit board section. The connection device can, for example, be defined by a so-called "Starrflex" printed circuit board. The third printed circuit board section typically comprises conductor tracks which extend from the first printed circuit board section through the third printed circuit board section into the second printed circuit board section. This provides a particularly reliable electrical connection between the first printed circuit board section and the second printed circuit board section which does not require solder joints and/or connector plugs. The flexible third printed circuit board section also makes it easy to realize particularly complex electrical circuits.

The evaluation electronics advantageously comprises at least one electronic component which is arranged between the first printed circuit board section and the magnetic field sensor. The at least one electronic component is thus arranged "below" the magnetic field sensor so that the at least one electronic component does not require any additional space on the printed circuit board arrangement. A plurality of evaluation electronics components can, for example, be arranged between the second printed circuit board section and the magnetic field sensor. This reduces the required printed circuit board area, which allows the realization of a particularly compact printed circuit board arrangement and thus a particularly compact rotary angle measuring system.

The rotary angle measuring system can, for example, comprise a second magnetic field sensor via which the excitation magnetic field generated by the excitation unit can be detected. The second magnetic field sensor enables a particularly precise and reliable detection of the excitation magnetic field and thus provides a particularly reliable rotary angle measuring system. One magnetic field sensor is typically a so-called Wiegand sensor and the other magnetic field sensor is a so-called Hall sensor. The first magnetic field sensor and the second magnetic field sensor can, for example, be arranged on opposite sides of the first printed circuit board section, wherein both magnetic field sensors can, for example, be positioned substantially concentric to the shaft. This provides a reliable and compact rotary angle measuring system.

In an embodiment of the present invention, the rotary angle measuring system can, for example, comprise a printed circuit board support element which supports the first printed circuit board section at a first axial side and which comprises a first snapping device via which the second printed circuit board section is attached to the printed circuit board support element in a form-locking manner. The printed circuit board support element can, for example, further comprise a positioning device via which the first printed circuit board section is radially and rotationally positioned as well as fixed. The printed circuit board support element can, for example, be substantially cylindrical and radially surrounds the excitation unit at least partially, wherein a recess is provided in the printed circuit board support element in which the second circuit board section can be fixed by the snapping device. During assembly, the printed circuit board arrangement is axially attached to the printed circuit board support member via the first printed circuit board section, and the second printed circuit board section is simply inserted into the snapping device. This allows for a simple assembly of the angle of rotation measuring system, with the entire printed circuit board arrangement, in particular including the angled second printed circuit board section, being reliably attached and aligned.

The rotary angle measuring system advantageously comprises a printed circuit board fixation element which is attached to the printed circuit board support element and which supports the first printed circuit board section at a second axial side located opposite to the first axial side. The printed circuit board fixation element is typically attached to the printed circuit board support element by a screw connection. The printed circuit board fixation element provides for a simple and reliable fixation of the printed circuit board arrangement. The printed circuit board fixation element can, for example, be substantially pot-shaped and substantially completely surrounds the first magnetic field sensor, for example, both magnetic field sensors, at a radially outer side. A recess can, for example, be provided in a radial bottom region of the printed circuit board fixation element into which an axial end of the magnetic field sensor facing away from the first printed circuit board section is inserted. The printed circuit board fixation element thus also provides mechanical protection for the sensitive magnetic field sensor.

In an embodiment of the present invention, the rotary angle measuring system can, for example, comprise a pot-shaped magnetizable shielding element, wherein the first magnetic field sensor, for example, both magnetic field sensors, and the first printed circuit board section are arranged to be completely within the shielding element. The shielding element is generally made of a soft magnetic metal and shields the magnetic field sensor(s) from external magnetic fields that may decrease the reliability and/or accuracy of the shaft rotary speed detection by the magnetic field sensor(s). The shielding element typically further defines a housing part of the rotary angle measuring system. The shielding element thus provides for a reliable and compact rotary angle measuring system.

The relatively sensitive evaluation electronics can, for example, also be arranged to be completely within the shielding element and thus to also be shielded from external magnetic fields. This provides a particularly reliable rotary angle measuring system.

In an embodiment of the present invention, a second snapping device can, for example, be provided on the printed circuit board support element and/or on the printed circuit board fixation element via which the shielding element is axially and rotationally fixed. The snapping device can, for example, be provided on a radially outer side of the printed circuit board support element and/or the printed circuit board fixation element, wherein the shielding element comprises at least one recess in a cylinder wall thereof into which the snapping device engages. The snapping device provides for a reliable alignment and attachment of the shielding element, wherein the shielding element can also be mounted in a simple manner.

The rotary angle measuring system can, for example, comprise a magnetizable shielding disk which radially surrounds the shaft. The shielding disk is generally made of a soft magnetic metal and shields the magnetic field sensor, for example, both magnetic field sensors, and the evaluation electronics from external magnetic fields, in particular from magnetic fields generated in a stator and/or a rotor of an electric motor which drives the shaft. This provides a particularly reliable rotary angle measuring system. The shielding disk can, for example, also define an adapter element via which the rotary angle measuring system can be easily attached to a predefined measuring system mounting device, for example, to a motor flange.

The rotary angle measuring system typically comprises a connector plug for an external power supply and/or for reading out/programming the rotary angle measuring system, which connector plug is arranged on the printed circuit board arrangement and which is electrically connected to the evaluation electronics. The connector plug usually protrudes substantially perpendicularly from the printed circuit board arrangement. The connector plug is advantageously arranged at a radially outer side of the second printed circuit board section. Only radial installation space and no additional axial installation space is therefore required for the connector plug and for a connecting plug which can be connected to the connector plug. This provides for a particularly compact rotary angle measuring arrangement. The connector plug is also arranged outside the radial and axial extension of the first magnetic field sensor, for example, outside the radial and axial extension of both magnetic field sensors, so that no opening for the connector plug must be provided in the shielding element within the extension of the magnetic field sensor(s). This provides for a particularly reliable shielding for the magnetic field sensor(s) and thus a particularly reliable rotary angle measuring system.

The present invention also provides a rotary angle measuring system with the above described features. The directions "radial" and "axial" here refer to the potential shaft orientation which the shaft has within an angle of rotation measuring system which is mounted on the shaft.

The present invention also provides an electric motor comprising a rotary angle measuring arrangement with the above described features, wherein the printed circuit board support element is attached to a motor flange. This provides for a particularly compact electric motor. The printed circuit board support element can be attached directly to the motor flange or can, for example, be attached to the motor flange via an adapter plate.

An embodiment of an electric motor according to the present invention comprising a rotary angle measuring arrangement according to the present invention is described below under reference to the drawings.

Figure 1:
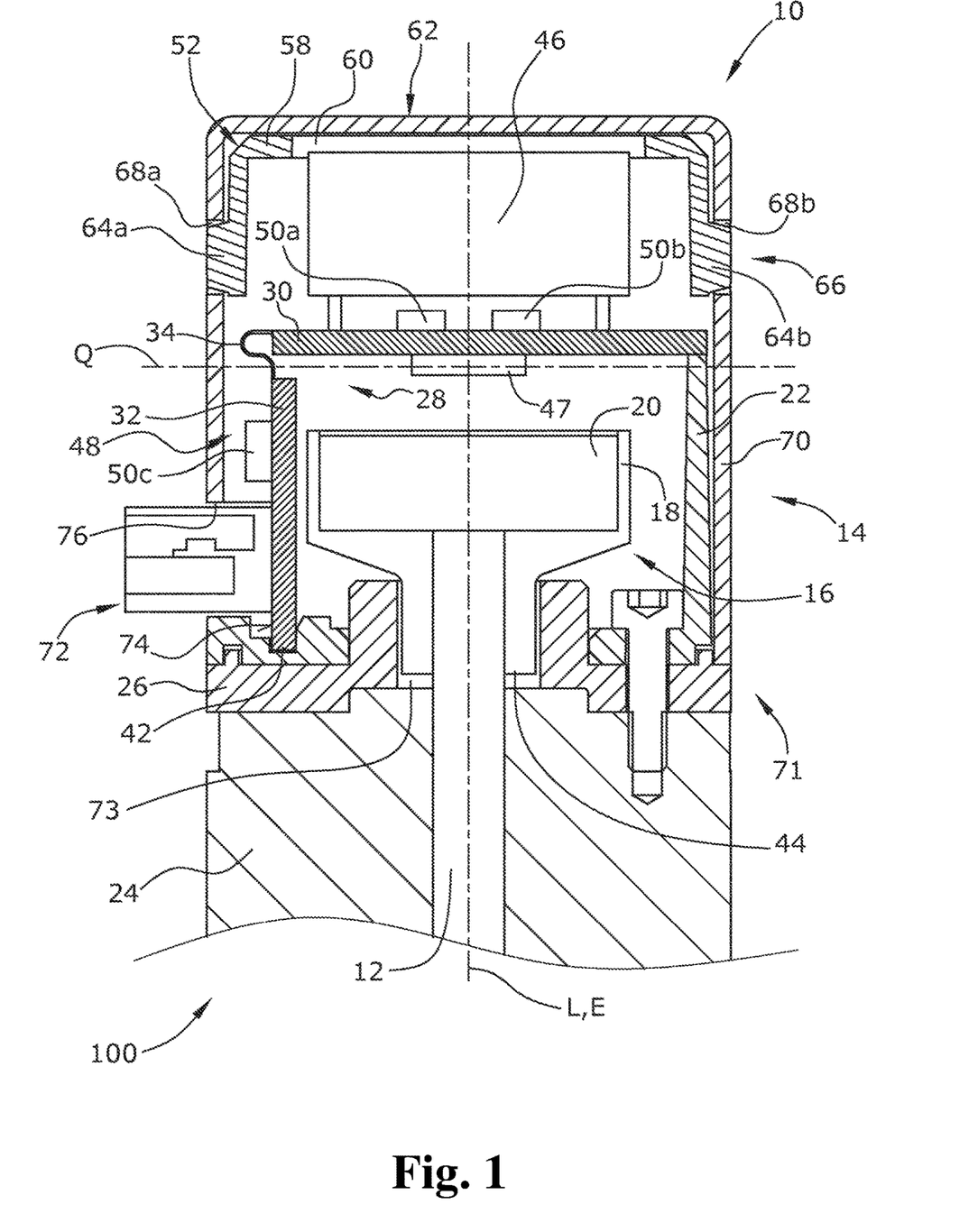
FIG. 1 shows a portion of an electric motor according to the present invention comprising a rotary angle measuring arrangement according to the present invention in partially sectioned view.

FIG. 1 shows an electric motor 100 comprising a rotary angle measuring arrangement 10 for detecting a rotary movement of a driven shaft 12 of the electric motor 100. The rotary angle measuring arrangement 10 comprises the shaft 12 and a rotary angle measuring system 14 arranged at the shaft 12.

The rotary angle measuring system 14 comprises an excitation unit 16 with a magnet holder 18 which is co-rotatably connected to the shaft 12, and with a permanent magnetic excitation magnet 20 which is mounted in the magnet holder 18 and thus co-rotatably connected to the shaft 12.

The rotary angle measuring system 14 further comprises a substantially cylindrical printed circuit board support element 22 which is attached to a motor flange 24 by a screw connection, wherein a soft magnetic metallic shielding disk 26 is arranged axially between the printed circuit board support element 22 and the motor flange 24. The shielding disk 26 radially surrounds the shaft 12 and, in the present embodiment, furthermore defines an adapter element for a simple and reliable attachment of the rotation angle measuring system 14 to the motor flange 24.

The rotary angle measuring system 14 further comprises a printed circuit board arrangement 28 with three printed circuit board sections 30, 32, 34. The first printed circuit board section 30 is shaped substantially like a circular segment and is arranged perpendicular to a longitudinal shaft axis L of the shaft 12. The first printed circuit board section 30 is supported by the printed circuit board support element 22 at a first axial side 31 which faces the excitation unit 16.

The second printed circuit board section 32 is shaped substantially rectangular and is arranged in a recess 36 which is formed within the printed circuit board support element 22, wherein the second printed circuit board section 32 is attached to the printed circuit board support element 22 in a form-locking manner via a first snapping device 40 which is defined by two snapping hooks 38. The second printed circuit board section 32 is arranged so that a parallel projection of the second printed circuit board section 32 onto a transverse plane Q of the rotary angle measuring arrangement 10 and a parallel projection of the first printed circuit board section 30 onto the transverse plane Q of the rotary angle measuring arrangement 10 almost completely overlap.

The second printed circuit board section 32 is arranged at an angle of 90° with respect to the first printed circuit board section 30 and radially neighboring the excitation unit 16.

Figure 2:
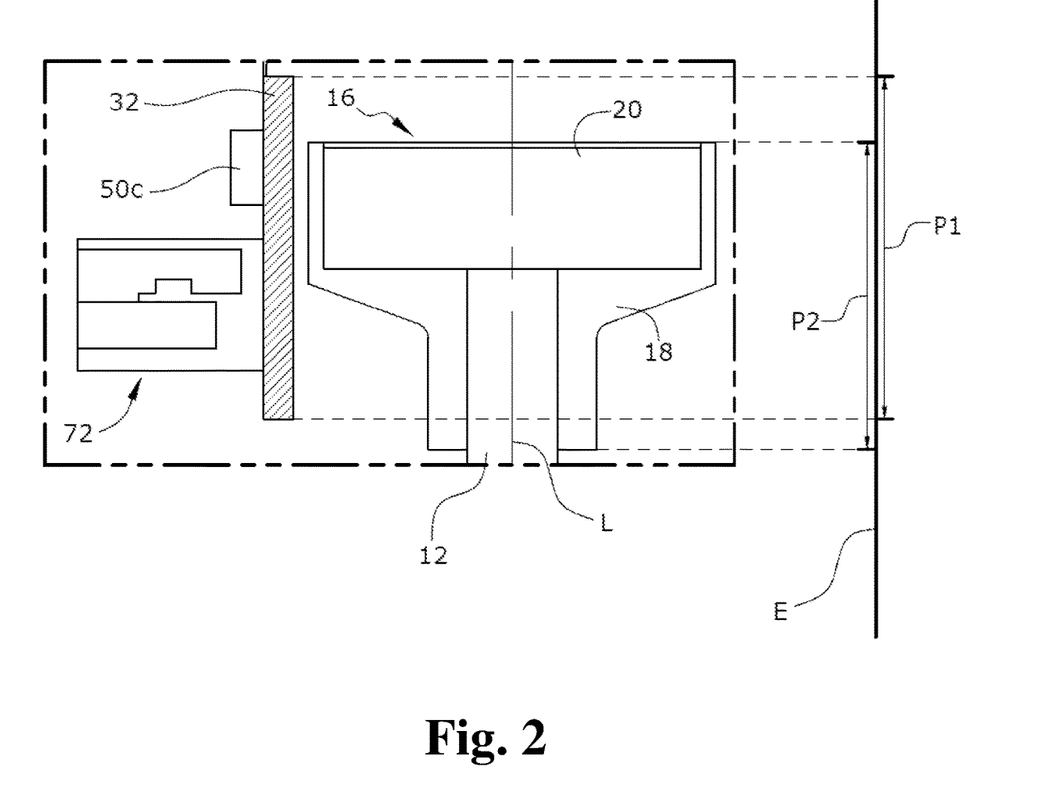
FIG. 2 shows a cut-out of FIG. 1 highlighting that a parallel projection of the second printed circuit board section onto a longitudinal plane which is parallel to the longitudinal shaft axis and a parallel projection of the excitation unit onto the longitudinal plane at least partially overlap.

The second printed circuit board section 32 is in particular arranged so that a parallel projection P1 of the second printed circuit board section 32 onto a longitudinal plane E, which is parallel to the longitudinal shaft axis L and includes the longitudinal shaft axis L, and a parallel projection P2 of the excitation unit 16 onto the longitudinal plane E, overlap. This is in particular shown in FIG. 2. The second printed circuit board section 32 is furthermore arranged so that an end 42 of the second printed circuit board section 32 facing away from the first printed circuit board section 30 does not axially project over an end 44 of the excitation unit 16 facing away from the first printed circuit board section 30.

The second printed circuit board section 32 is electrically connected to the first printed circuit board section 30 via a connection device 34. The connection device 34 in the present embodiment is defined by a third printed circuit board section which is flexible and which comprises conductor tracks (which are not shown in more detail). The connection device 34 can, for example, be defined by a so-called "Starrflex" printed circuit board.

The rotary angle measuring system 14 further comprises a first magnetic field sensor 46 which, in the present embodiment, is a so-called Wiegand sensor, and a second magnetic field sensor 47 which, in the present embodiment, is a so-called Hall sensor. Both magnetic field sensors 46,47 are arranged axially neighboring the excitation unit 16 and substantially concentric to the shaft 12 and to the excitation magnet 20 on the first printed circuit board section 30 so that an excitation magnetic field which is generated by the excitation unit 16 can be detected by both magnetic field sensors 46,47. The first magnetic field sensor 46 and the second magnetic field sensor 47 are arranged at opposite axial sides of the first printed circuit board section 30.

The rotary angle measuring system 14 further comprises an evaluation electronics 48 which is defined by a plurality of electronic components 50a-50c which are arranged on the printed circuit board arrangement 28. The evaluation electronics 48 is electrically connected to the two magnetic field sensors 46,47 so as to evaluate sensor signals generated by the magnetic field sensors 46,47. In the present embodiment, several electronic components 50a,50b of the evaluation electronics 48 are arranged below the first magnetic field sensor 46, i.e., arranged axially between the first printed circuit board section 30 and the first magnetic field sensor 46.

The rotary angle measuring system 14 further comprises a substantially pot-shaped printed circuit board fixation element 52 which is attached to the printed circuit board support element 22 by a screw connection and which axially supports the first printed circuit board section 30 at a second axial side 54 located opposite the first axial side 31. The first printed circuit board section 30 is thus axially fixed by the printed circuit board fixation element 52 and the printed circuit board support element 22. The screw connection extends axially through a (not shown) bore of the first printed circuit board section 30 so that the first printed circuit board section 30 is radially and rotationally fixed by the screw connection. In the present embodiment, a cylinder wall 56 of the printed circuit board fixation element 52 completely surrounds both magnetic field sensors 46,47 at a radially outer side, and a bottom wall 58 of the printed circuit board fixation element 52 comprises a recess 60 into which the first magnetic field sensor 46 is inserted.

Figure 3:
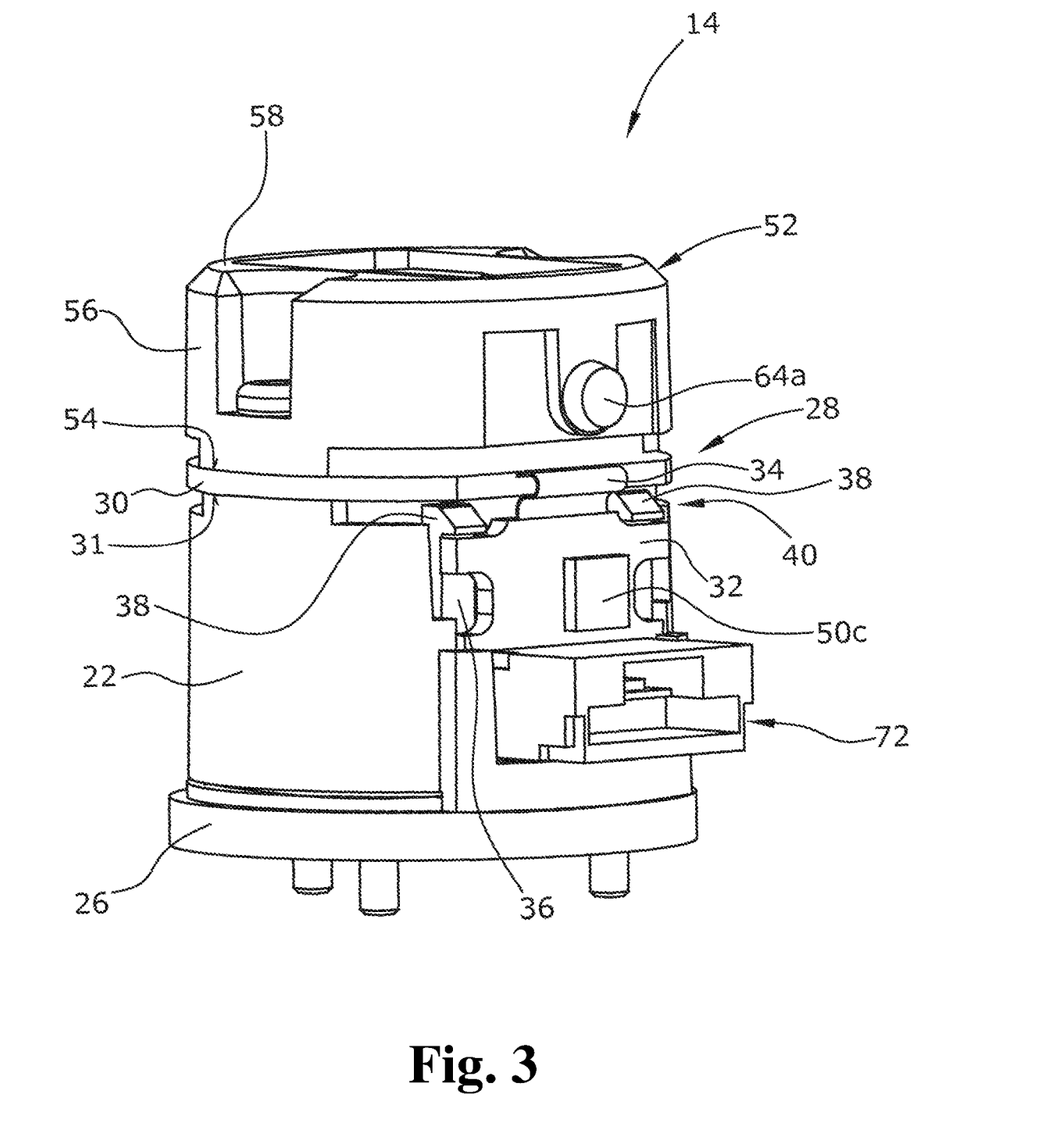
FIG. 3 shows a perspective view of a rotary angle measuring system of the rotary angle measuring arrangement of FIG. 1 without a shielding element.

The rotary angle measuring system 14 further comprises a substantially pot-shaped soft magnetic metallic shielding element 62. The shielding element 62 is attached to the printed circuit board fixation element 52 via a second snapping device 66 which is defined by a plurality of snapping elements 64a,64b and which engages corresponding recesses 68a,68b in a cylinder wall 70 of the shielding element 62 and is axially and rotationally fixed. The shielding element 62 defines a housing part of the rotary angle measuring system 14 in the present embodiment. Both magnetic field sensors 46,47 and the first printed circuit board section 30 are arranged to be completely within the shielding element 62, and are thus reliably shielded from external magnetic fields by the shielding element 62. All electronic components 50a-50c of the evaluation electronics 48 are also arranged within the shielding element 62. In the present embodiment, the shielding element 62 axially abuts the shielding disk 26 and, together with the shielding disk 26, defines a shielding arrangement 71 which surrounds both magnetic field sensors 46,47 and the entire evaluation electronics 48 substantially completely in all spatial directions (with the exception of the recesses 76 for the connector plug 72, the recesses 78a,b for the second snapping device, and a recess 73 through which the shaft 12 extends) and thus effectively shields them from external magnetic fields.

The rotary angle measuring system 14 further comprises a connector plug 72 for external power supply and for reading out/programming the rotary angle measuring system 14. The connector plug 72 is arranged at a radially outer side 74 of the second printed circuit board section 32 and is electrically connected to the evaluation electronics 48. The cylinder wall 70 of the shielding element 62 comprises a recess 76 through which the connector plug 72 extends.

The present invention is not limited to embodiments described herein; reference should be had to the appended claims.

LIST OF REFERENCE NUMERALS 10 rotary angle measuring arrangement
12 shaft
14 rotary angle measuring system
16 excitation unit
18 magnet holder
20 excitation magnet
22 printed circuit board support element
24 motor flange
26 shielding disk
28 printed circuit board arrangement
30 first printed circuit board section
31 first axial side (of first printed circuit board section 30)
32 second printed circuit board section
34 connection device
36 recess
38 snapping hook
40 first snapping device
42 end (of second printed circuit board section 32)
44 end (of excitation unit 16)
46 first magnetic field sensor
47 second magnetic field sensor
48 evaluation electronics
50a-50c electronic components
52 printed circuit board fixation element
54 second axial side (of first printed circuit board section 30)
56 cylinder wall
58 bottom wall
60 recess
62 shielding element
64a,64b snapping elements
66 second snapping device 68a,68b recesses
70 cylinder wall
71 shielding arrangement
72 connector plug
73 recess
74 radially outer side (of second printed circuit board section 32)
76 recess
100 electric motor
E longitudinal plane
L longitudinal shaft axis
P1 Parallel projection of the second printed circuit board section 32 onto longitudinal plane E
P2 Parallel projection of the excitation unit 16 onto longitudinal plane E
Q transverse plane

What is claimed is:

1. A rotary angle measuring arrangement comprising:
a shaft which is configured to rotate, the shaft comprising a longitudinal shaft axis; and
a rotary angle measuring system which is configured to detect a rotary shaft movement, the rotary angle measuring system comprising,
an excitation unit which is configured to generate an excitation magnetic field and which is co-rotatably connected to the shaft, the excitation unit comprising at least one permanent magnetic excitation magnet,
a printed circuit board arrangement comprising,
a first printed circuit board section which is arranged perpendicular to the longitudinal shaft axis, and
a second printed circuit board section which is arranged at an angle with respect to the first printed circuit board section and which is electrically connected to the first printed circuit board section via a connection device,
a first magnetic field sensor which is arranged on the first printed circuit board section, the excitation magnetic field generated by the excitation unit being detectable via the first magnetic field sensor, and
an evaluation electronics which is arranged on the printed circuit board arrangement and which is electrically connected to the first magnetic field sensor, wherein,
the second printed circuit board section is arranged so that a parallel projection of the second printed circuit board section onto a longitudinal plane which is parallel to the longitudinal shaft axis and a parallel projection of the excitation unit onto the longitudinal plane at least partially overlap,
the evaluation electronics comprises at least one electronic component which is arranged between the first printed circuit board section and the first magnetic field sensor,
the rotary angle measuring system further comprises a second magnetic field sensor via which the excitation magnetic field generated by the excitation unit is detectable, and
the first magnetic field sensor and the second magnetic field sensor are arranged on opposite sides of the first printed circuit board section.

2. The rotary angle measuring arrangement as recited in claim 1, wherein the angle between the first printed circuit board section and the second printed circuit board section is in a range from 70° to 110°.

3. The rotary angle measuring arrangement as recited in claim 1, wherein the angle between the first printed circuit board section and the second printed circuit board section is in a range from 80° to 100°.

4. The rotary angle measuring arrangement as recited in claim 1, wherein the second printed circuit board section is arranged so that a parallel projection of the second printed circuit board section onto a transverse plane which is perpendicular to the longitudinal shaft axis and a parallel projection of the first printed circuit board section onto the transverse plane at least partially overlap.

5. The rotary angle measuring arrangement as recited in claim 1, wherein the connection device is defined by a flexible third printed circuit board section.

6. The rotary angle measuring arrangement as recited in claim 1, wherein,
the rotary angle measuring system further comprises a pot-shaped magnetizable shielding element, and
the first magnetic field sensor and the first printed circuit board section are arranged to be completely within the pot-shaped magnetizable shielding element.

7. The rotary angle measuring arrangement as recited in claim 6, wherein the evaluation electronics is also arranged to be completely within the pot-shaped magnetizable shielding element shielding element.

8. The rotary angle measuring arrangement as recited in claim 1, wherein the rotary angle measuring system further comprises,
a printed circuit board support element which supports the first printed circuit board section at a first axial side, and
a first snapping device via which the second printed circuit board section is attached to the printed circuit board support element in a form-locking manner.

9. The rotary angle measuring arrangement as recited in claim 8, wherein,
the rotary angle measuring system further comprises a pot-shaped magnetizable shielding element,
the first magnetic field sensor and the first printed circuit board section are arranged to be completely within the pot-shaped magnetizable shielding element,
a second snapping device is defined by the printed circuit board support element, and
the pot-shaped magnetizable shielding element is axially and rotationally fixed via the second snapping device.

10. The rotary angle measuring arrangement as recited in claim 8, wherein the rotary angle measuring system further comprises a printed circuit board fixation element which is attached to the printed circuit board support element and which supports the first printed circuit board section at a second axial side which is opposite to the first axial side.

11. The rotary angle measuring arrangement as recited in claim 10, wherein,
the rotary angle measuring system further comprises a pot-shaped magnetizable shielding element,
the first magnetic field sensor and the first printed circuit board section are arranged to be completely within the pot-shaped magnetizable shielding element,
a second snapping device is defined by the printed circuit board fixation element, and
the pot-shaped magnetizable shielding element is axially and rotationally fixed via the second snapping device.

12. An electric motor comprising:
the rotary angle measuring arrangement as recited in claim 8, wherein,
the shaft is driven by the electric motor, and
the printed circuit board support element is attached to a motor flange.

13. The rotary angle measuring arrangement as recited in claim 1, wherein the rotary angle measuring system further comprises a magnetizable shielding disk which radially surrounds the shaft.

14. The rotary angle measuring arrangement as recited in claim 1, wherein,
the rotary angle measuring system further comprises a connector plug which is electrically connected to the evaluation electronics, and
the connector plug is arranged at a radially outer side of the second printed circuit board section.

15. A rotary angle measuring system for the rotary angle measuring arrangement as recited in claim 1.

16. A rotary angle measuring arrangement comprising:
a shaft which is configured to rotate, the shaft comprising a longitudinal shaft axis; and
a rotary angle measuring system which is configured to detect a rotary shaft movement, the rotary angle measuring system comprising,
an excitation unit which is configured to generate an excitation magnetic field and which is co-rotatably connected to the shaft, the excitation unit comprising at least one permanent magnetic excitation magnet,
a printed circuit board arrangement comprising,
a first printed circuit board section which is arranged perpendicular to the longitudinal shaft axis, and
a second printed circuit board section which is arranged at an angle with respect to the first printed circuit board section and which is electrically connected to the first printed circuit board section via a connection device,
a first magnetic field sensor which is arranged on the first printed circuit board section, the excitation magnetic field generated by the excitation unit being detectable via the first magnetic field sensor,
an evaluation electronics which is arranged on the printed circuit board arrangement and which is electrically connected to the first magnetic field sensor,
a printed circuit board support element which supports the first printed circuit board section at a first axial side, and
a first snapping device via which the second printed circuit board section is attached to the printed circuit board support element in a form-locking manner, wherein,
the second printed circuit board section is arranged so that a parallel projection of the second printed circuit board section onto a longitudinal plane which is parallel to the longitudinal shaft axis and a parallel projection of the excitation unit onto the longitudinal plane at least partially overlap.

17. The rotary angle measuring arrangement as recited in claim 16, wherein the evaluation electronics comprises at least one electronic component which is arranged between the first printed circuit board section and the first magnetic field sensor.

18. The rotary angle measuring arrangement as recited in claim 16, wherein the rotary angle measuring system further comprises a second magnetic field sensor via which the excitation magnetic field generated by the excitation unit is detectable.

19. The rotary angle measuring arrangement as recited in claim 18, wherein the first magnetic field sensor and the second magnetic field sensor are arranged on opposite sides of the first printed circuit board section.

20. The rotary angle measuring arrangement as recited in claim 16, wherein the first snapping device is defined by two snapping hooks.

\* \* \* \* \*